United States Patent [19]

Lim

[11] Patent Number: 5,790,212

[45] Date of Patent: Aug. 4, 1998

[54] THIN FILM TRANSISTOR-LIQUID CRYSTAL DISPLAY HAVING TESTING PADS

[75] Inventor: Byoung Ho Lim, Kyungsangbuk-do, Rep. of Korea

[73] Assignee: LG Electronics Inc., Seoul, Rep. of Korea

[21] Appl. No.: 790,860

[22] Filed: Feb. 3, 1997

[30] Foreign Application Priority Data

Jul. 22, 1996 [KR] Rep. of Korea ............... 29584/1996

[51] Int. Cl.⁶ .......................... G02F 1/136; G02F 1/1345
[52] U.S. Cl. ..................... 349/42; 349/139; 349/149
[58] Field of Search ................... 349/42, 40, 139, 349/149, 151, 152, 158; 324/770, 158.1; 445/3, 24

[56] References Cited

U.S. PATENT DOCUMENTS

| | | | |
|---|---|---|---|
| 4,422,731 | 12/1983 | Droguet et al. | 349/151 |
| 5,162,993 | 11/1992 | Kakuda et al. | 349/38 |
| 5,406,398 | 4/1995 | Suzuki et al. | 349/143 |
| 5,488,498 | 1/1996 | Fujii et al. | 349/149 |
| 5,530,568 | 6/1996 | Yamamoto et al. | 349/143 |
| 5,657,139 | 8/1997 | Hayashi | 349/40 |

*Primary Examiner*—Hung X. Dang
*Assistant Examiner*—Tai V. Duong
*Attorney, Agent, or Firm*—Morgan, Lewis & Bockius LLP

[57] ABSTRACT

A thin film transistor-liquid crystal display includes a bottom plate; a common electrode formed on the bottom plate; a top plate; a common electrode formed on the top plate, wherein the bottom and top plates are bonded to each other with the common electrodes of the bottom and top plates electrically connected to each other, and wherein at least one of the common electrodes of the top and bottom plates extends beyond the bond region of the top and bottom plates.

12 Claims, 6 Drawing Sheets

THIN FILM TRANSISTOR-LIQUID CRYSTAL DISPLAY HAVING TESTING PADS

BACKGROUND OF THE INVENTION

This application claims the benefit of application No. 29584/1996, filed in Korea on Jul. 22, 1996, which is hereby incorporated by reference.

FIELD OF THE INVENTION

The present invention relates to a thin film transistor-liquid crystal display (TFT-LCD) and, more particularly, to a TFT-LCD which measures the output waveform of the common electrode.

DISCUSSION OF RELATED ART

Generally, a TFT-LCD consists of a bottom plate on which a plurality of pixel regions are arranged as a matrix with one TFT and pixel electrode formed at every pixel region, a top plate on which a color filter for displaying colors and a common electrode are formed, and a liquid crystal filled between the top and bottom plates. Polarizing plates, which polarize visible light, are respectively attached to the surfaces of the top and bottom plates.

In a conventional TFT-LCD as described above, the bottom plate is larger than the top plate, and a drive integrated circuit (IC) for driving the TFT-LCD is formed on the bottom plate. Furthermore, a line for applying a common voltage to the common electrode formed on the top plate is also formed on the bottom plate. This line is connected to the common electrode of the top plate at a silver (Ag) dotting point. The conventional TFT-LCD will be explained below with reference to the accompanying drawings.

FIG. 1 is a plan view showing top and bottom plates of the conventional TFT-LCD; FIG. 2 shows a portion I of FIG. 1 in detail, and FIG. 3 is a cross-sectional view taken along line II—II of FIG. 2. Referring to FIG. 1, bottom plate 2 on which TFTs and pixel electrodes are arranged, and top plate 1 on which a common electrode is formed are connected to each other through Ag dotting point 5. Here, bottom plate 2 is larger than top plate 1.

Referring to FIG. 2, a pad 4 for applying a voltage to the common electrode is formed only inside of a portion defined by a scribe line 6 of top plate 1, and it is connected to a pad terminal 7 through a bus line.

Referring to FIG. 3, a pad layer 11 is formed on a predetermined portion of a transparent insulating substrate 10, and a first insulating layer 12 is formed on substrate 10 and a portion of pad layer 11 other than its center. A first metal layer 13 is formed on an exposed portion of pad layer 11 and both edges of first insulating layer 12, and an indium tin oxide (ITO) layer 14 of the bottom plate is formed on first metal layer 13 and first insulating layer 12. ITO layer 14 is formed inside of a portion defined by scribe line 6 of the top plate. An ITO layer 16 of the top plate and ITO layer 14 of the bottom plate are connected to each other through Ag dotting point 17.

However, problems exist with the above-described conventional TFT-LCD. For example, the output waveform of the common electrode cannot be measured after the top and bottom plates are bonded to each other because the ITO layer of the bottom plate is formed only inside of the portion described by scribe line of the top plate. Accordingly, it is difficult to discriminate the output waveform when a distorted waveform is applied to the common electrode, thereby deteriorating the picture quality.

SUMMARY OF THE INVENTION

Accordingly, the present invention is directed to a TFT-LCD that substantially obviates one or more of the problems due to limitations and disadvantages of the related art.

An object of the present invention is to provide a TFT-LCD whose common electrode output waveform is measured, thereby improving picture quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the thin film transistor-liquid crystal display includes a bottom plate; a common electrode formed on the bottom plate; a top plate; a common electrode formed on the top plate, wherein the bottom and top plates are bonded to each other with the common electrodes of the bottom and top plates electrically connected to each other, and wherein at least one of the common electrodes of the top and bottom plates extends beyond the bond region of the top and bottom plates.

In another aspect, the thin film transistor-liquid crystal display includes a top plate; a scribe line formed on the top plate; a bottom plate which is bonded to the top plate; a scribe line formed on the bottom plate, the scribe line of the bottom plate corresponding to a scribe line of the top plate; and an indium tin oxide layer formed on the bottom plate, wherein the indium tin oxide layer extends beyond the scribe line.

In another aspect, the thin film transistor-liquid crystal display includes a top plate; a first transparent conductive layer formed on the top plate; a bottom plate; a pad layer formed on a predetermined portion of the bottom plate; a first insulating layer formed on the bottom plate including a portion of the pad layer, to expose a predetermined portion of the pad layer; a second transparent conductive layer formed over the bottom plate, wherein the second transparent conductive layer extends beyond a boundary line of the top plate, and wherein the second transparent conductive layer is electrically connected with the exposed portion of the pad layer; and a dotting point which connects the first and second transparent conductive layers.

To further achieve these and other advantages and in accordance with the purpose of the present invention, as embodied and broadly described, a TFT-LCD whose top and bottom plates are bonded to each other includes a scribe line placed on the bottom plate, the scribe line corresponding to a scribe line of the top plate; and an ITO layer extending beyond the scribe line.

In another aspect, the TFT-LCD includes an ITO layer formed on a top plate; a bottom plate; a pad layer formed on a predetermined portion of the bottom plate; a first insulating layer formed on the bottom plate including a portion of the pad layer, to expose a predetermined portion of the pad layer; an ITO layer formed on the bottom plate, the ITO layer being extending beyond a boundary line of the top plate, to come into contact with the exposed portion of the pad layer; and an Ag dotting point for connecting the ITO layer of the top plate to the ITO layer of the bottom plate.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF PREFERRED EMBODIMENT

Reference will now be made in detail to the preferred embodiments of the present invention, examples of which are illustrated in the accompanying drawings.

Figure 1:
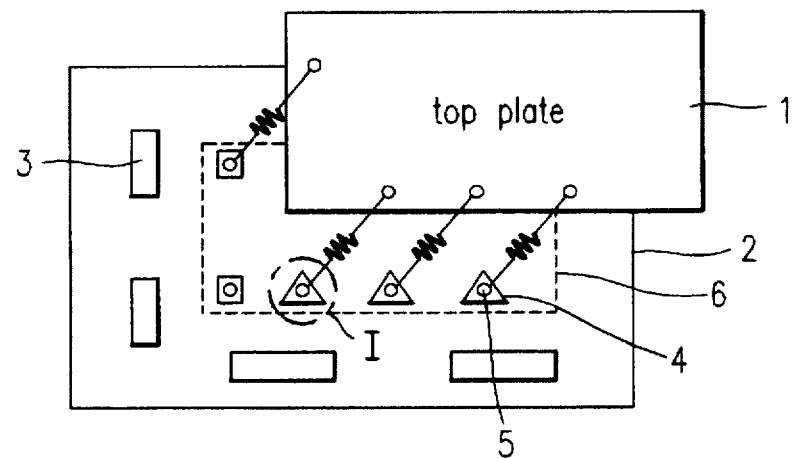
FIG. 1 is a plan view showing top and bottom plates of a conventional TFT-LCD.
Figure 2:
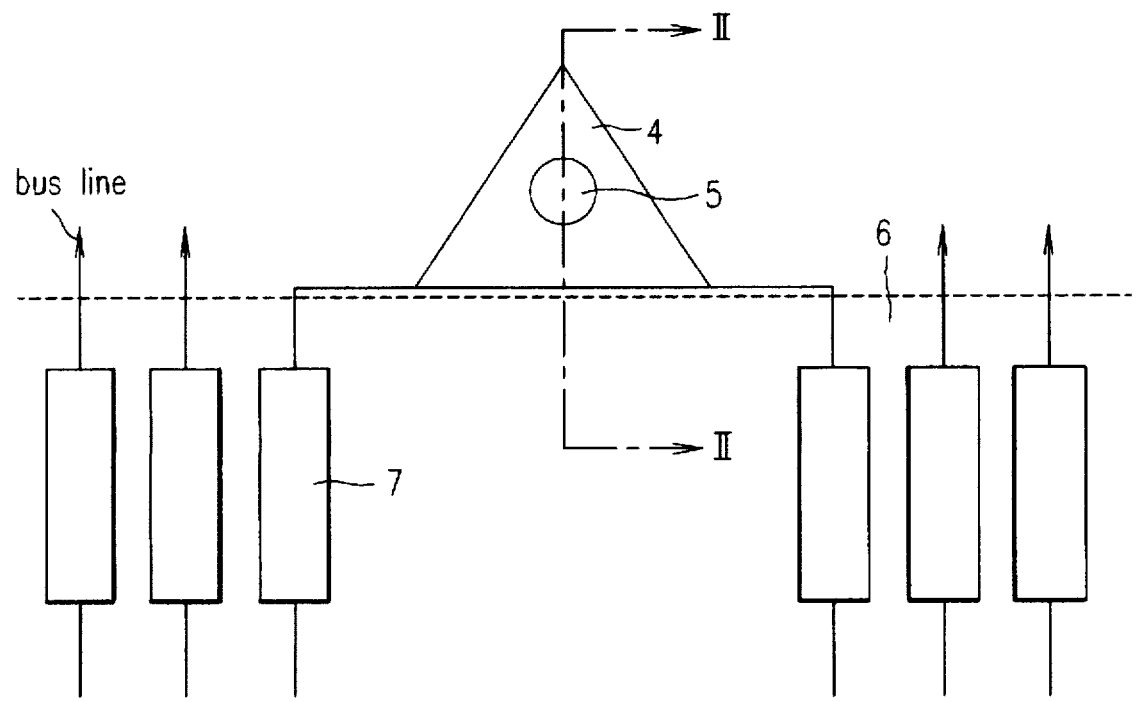
FIG. 2 is a detail of portion I of the TFT-LCD of FIG. 1.
Figure 3:
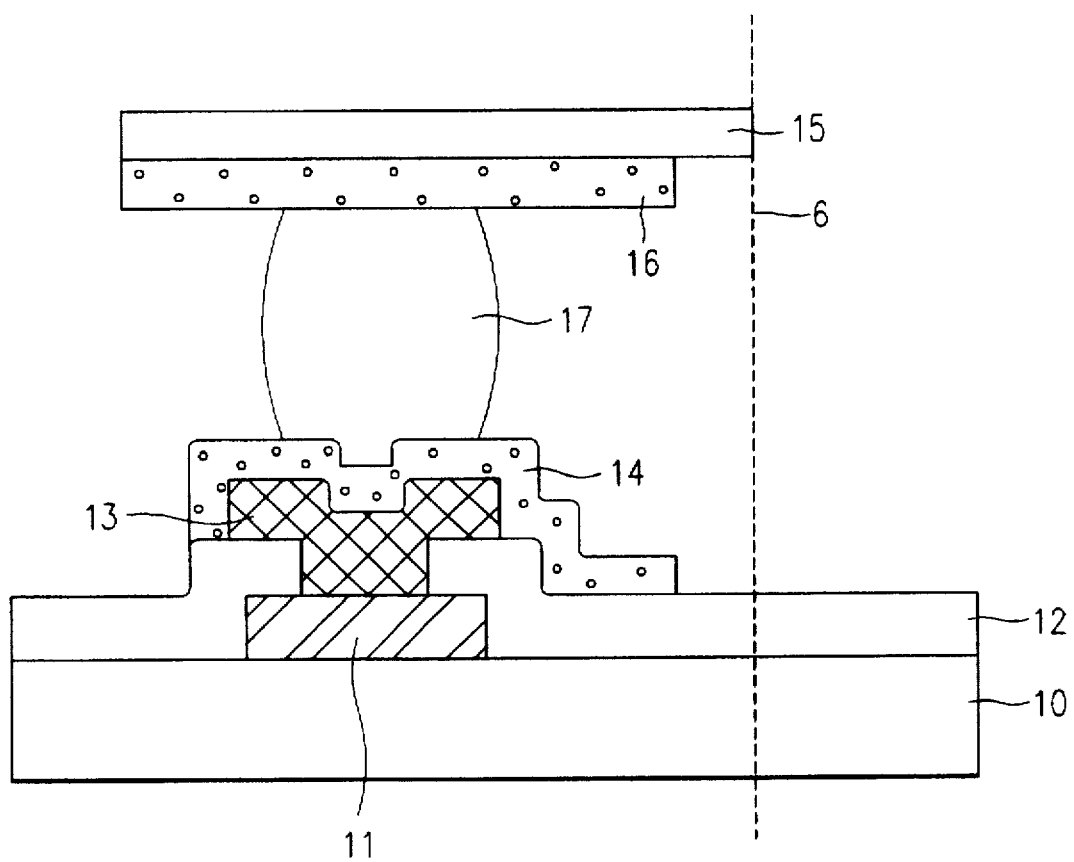
FIG. 3 is a cross-sectional view of the conventional TFT-LCD taken along line II—II of FIG. 2.
Figure 4A:
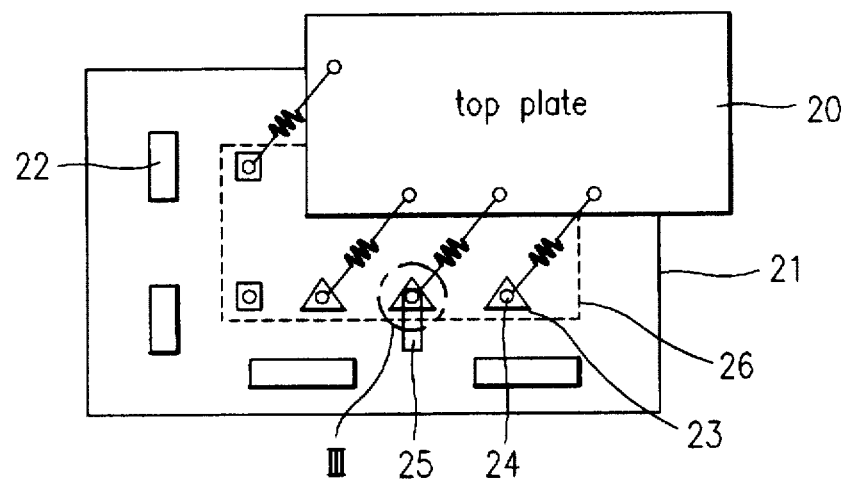
FIG. 4A is a plan view showing top and bottom plates of a TFT-LCD according to the present invention.
Figure 4B:
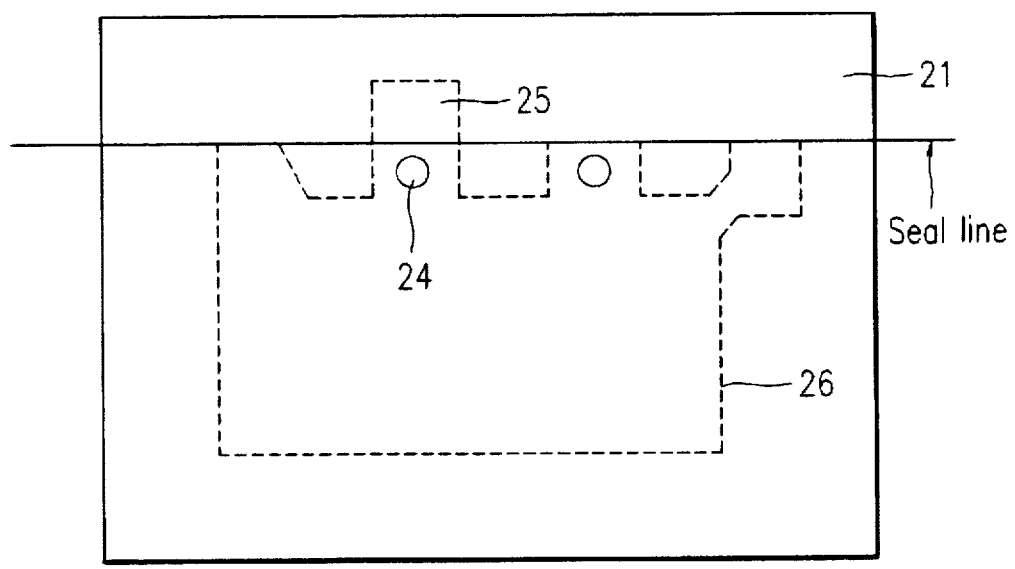
FIG. 4B is a plan view of the bottom plate of the TFT-LCD according to the present invention.

FIG. 4A is a plan view showing top and bottom plates of a TFT-LCD according to the present invention, and FIG. 4B is a plan view of the bottom plate of the TFT-LCD according to the present invention. As shown in FIGS. 4A and 4B, a plurality of pads 22 are formed on a bottom plate 21. Top plate 20 and bottom plate 21 are connected to each other through an Ag dotting point 24 of a transparent conductive layer, such as an ITO layer. Here, an ITO extension layer 25 of the bottom plate is extended beyond a scribe line 26 of the top plate. Ag dotting point 24 is formed inside of a pad 23 for applying a voltage to a common electrode of the TFT-LCD. Accordingly, the output waveform of the common electrode can be measured through ITO extension layer 25 of the bottom plate, thereby permitting the improvement of picture quality.

Figure 5:
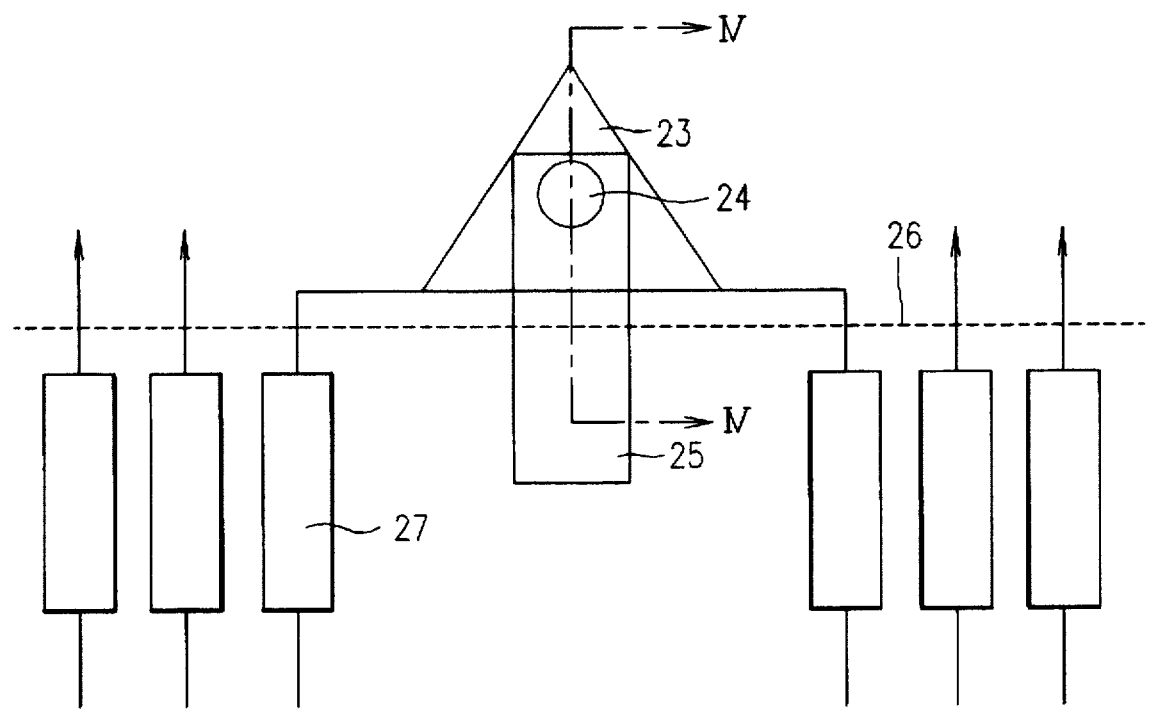
FIG. 5 is a detail of portion III of the TFT-LCD of FIG. 4A.

FIG. 5 shows portion III of FIG. 4A in detail. As shown in FIG. 5, pad 23 is formed inside of a portion defined by scribe line 26 of the top plate 20, and ITO extension layer 25 of the bottom plate 21 is extended beyond scribe line 26.

Figure 6A:
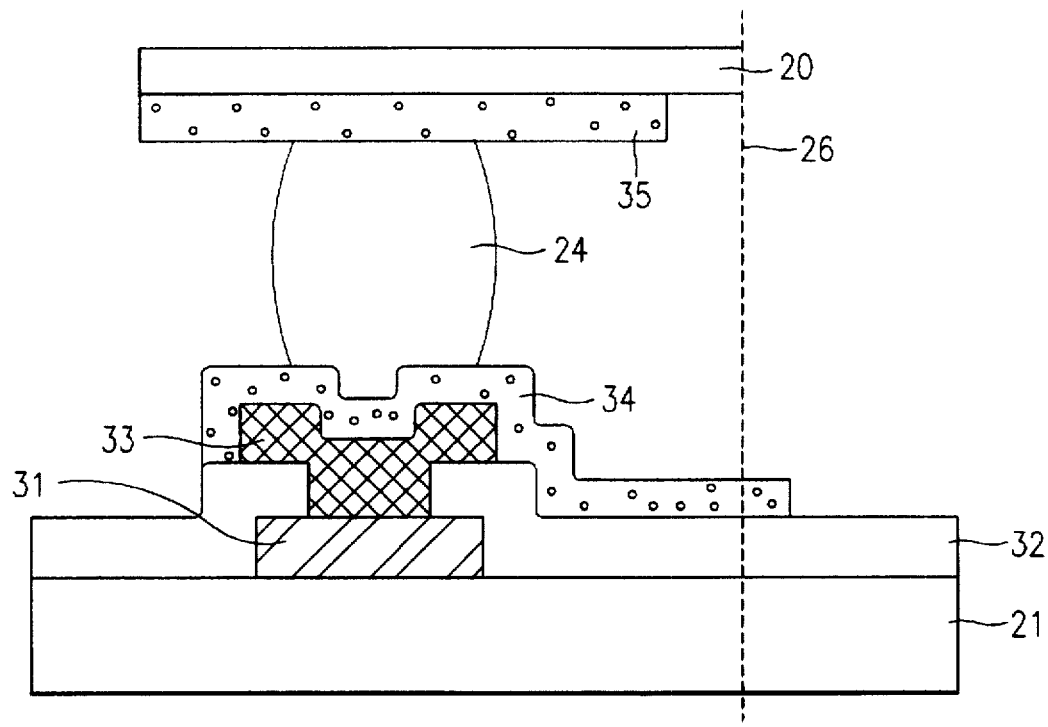
FIGS. 6A to 6D are cross-sectional views of the TFT-LCD taken along line IV—IV of FIG. 5.

FIGS. 6A to 6D are cross-sectional views taken along line IV—IV of FIG. 5. As shown in FIG. 6A, a pad layer 31 is formed on a predetermined portion of a bottom plate 21, and a first insulating layer 32 is formed on the overall surface of the bottom plate 21 including a portion of pad layer 31 other than the center of pad layer 31. A first metal layer 33 is formed on the exposed center portion of pad layer 31, and an ITO layer 34 of the bottom plate 21 is formed on first metal layer 33 and first insulating layer 32, to extend beyond scribe line 26 of the top plate 20. An ITO layer 35 of the top plate 20 is formed on top plate 20, and Ag dotting point 24 is formed between the top and bottom plates 20 and 21 to connect ITO layer 35 of the top plate 20 to ITO layer 34 of the bottom plate 21.

Figure 6B:
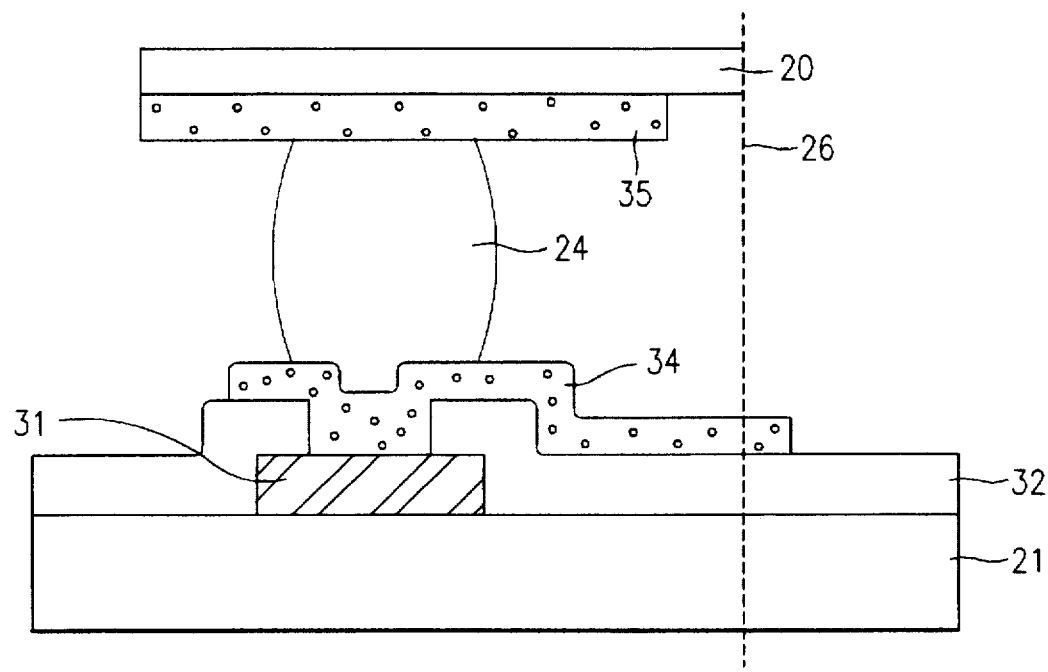

Referring to FIG. 6B, pad layer 31 is formed on a predetermined portion of bottom plate 21, and first insulating layer 32 is formed on the overall surface of the bottom plate 21 including a portion of pad layer 31 other than the center of pad layer 31. ITO layer 34 of the bottom plate 21 is formed on first insulating layer 32 to come into contact with the exposed portion of pad layer 31. Here, ITO layer 34 is extended beyond scribe line 26 of the top plate 20. ITO layer 35 of the top plate 20 is formed on top plate 20, and Ag dotting point 24 is formed between the top and bottom plates 20 and 21 to connect ITO layer 35 of the top plate 20 to ITO layer 34 of the bottom plate 21.

Figure 6C:
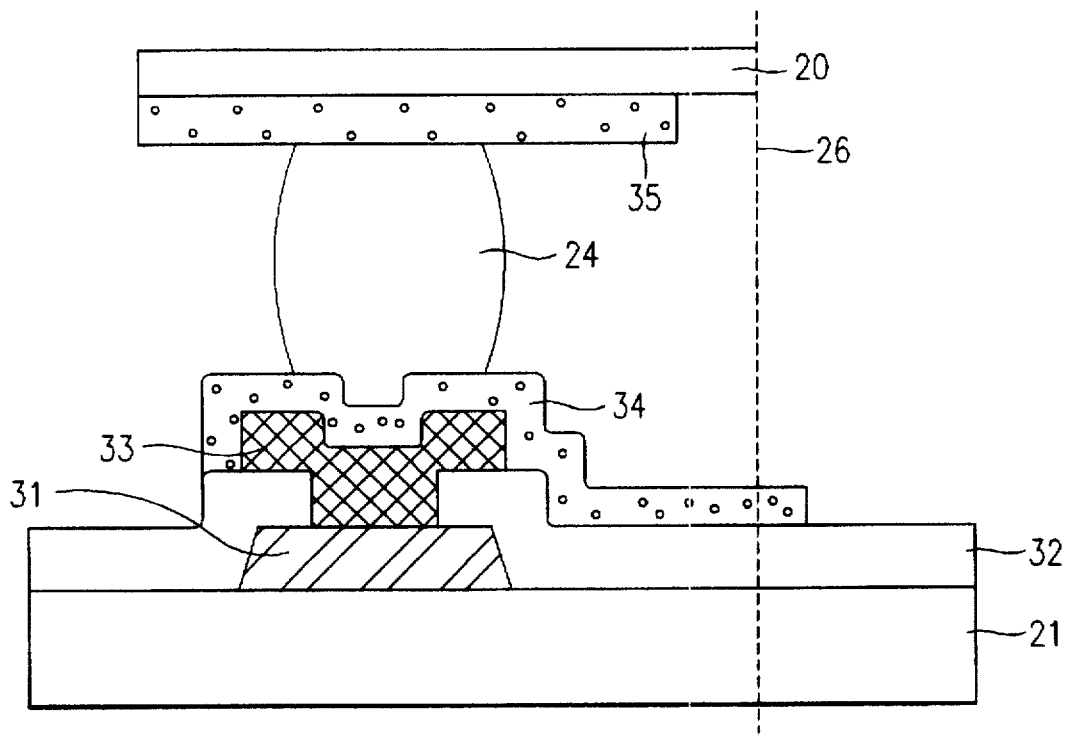
Figure 6D:
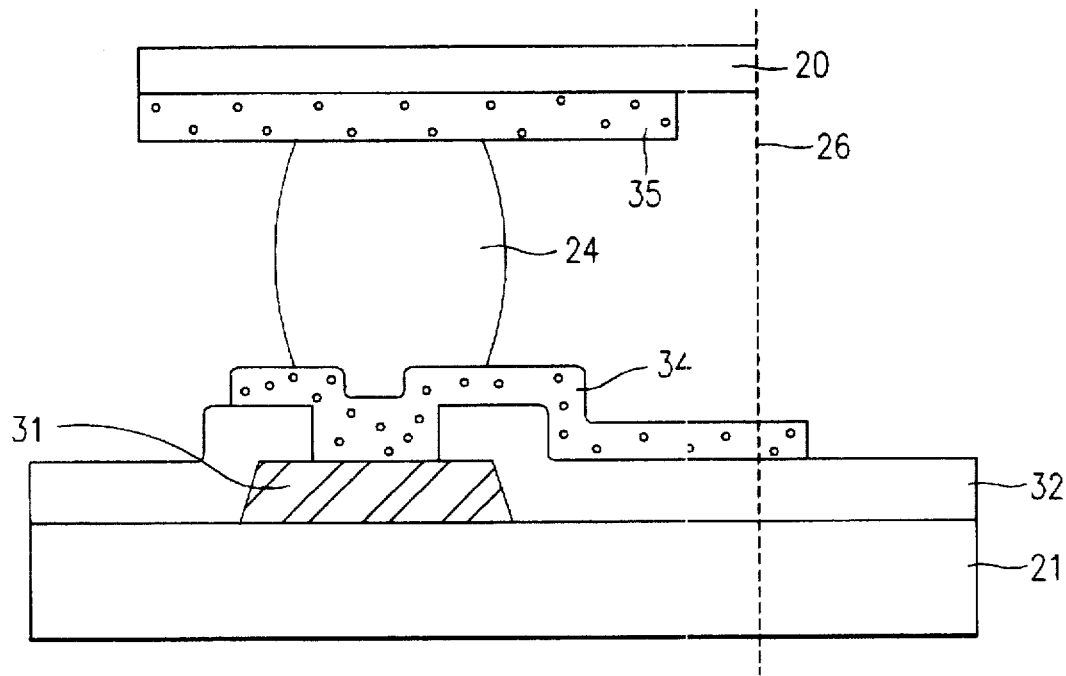

As shown in FIGS. 6C and 6D, tapered pad layers 31 can be formed on a predetermined portion of bottom plate 20.

The present invention has the following advantages. First, the output waveform of the common electrode can be measured through the ITO extension layer of the bottom plate, which extends beyond the scribe line of the top plate after the two plates are bonded to each other, thereby improving the picture quality. Second, the pad for measuring the common electrode output waveform is formed from the ITO layer, instead of a semiconductor layer or a material forming the source and drain of the TFT-LCD. Accordingly, the pad will not be corroded even if it is exposed to air. Third, it is possible to improve crosstalk and charge coupling characteristics which are generated from the distortion of the common electrode output waveform using the output waveform measured through the ITO layer of the bottom plate.

It will be apparent to those skilled in the art that various modifications and variations can be made in the TFT-LCD of the present invention without departing from the spirit or scope of the invention. Thus, it is intended that the present invention cover the modifications and variations of this invention provided they come within the scope of the appended claims and their equivalents.

What is claimed is:

1. A thin film transistor-liquid crystal display comprising:

a bottom plate;

a connection electrode formed on the bottom plate;

a pad terminal on the bottom plate for externally providing a voltage to the connection electrode on the bottom plate;

a top plate bonded to the bottom plate; and a common electrode formed on the top plate, wherein the bottom and top plates are bonded to each other with the common electrode and the connection electrode electrically connected to each other, and wherein the connection electrode of the bottom plate extends beyond a scribe line to provide an externally accessible testing pad for measuring a voltage that is applied to the connection electrode through the pad terminal of the bottom plate.

2. A thin film transistor-liquid crystal display comprising:

a top plate having a common electrode thereon;

a bottom plate bonded to the top plate so as to face the common electrode of the top plate, the bottom plate having a non-overlapping area extending beyond the top plate and an overlapping area corresponding to the top plate;

a pad terminal at the non-overlapping area for receiving a common voltage: and an indium tin oxide layer formed on the bottom plate and electrically connected to the common electrode of the top plate within the overlapping area, the indium tin oxide layer being connected to the pad terminal for supplying the common voltage to the common electrode, wherein the indium tin oxide layer extends over the non-overlapping area to provide an externally accessible pad for monitoring the common voltage actually applied to the common electrode of the top plate.

3. The thin film transistor-liquid crystal display according to claim 2, wherein the indium tin oxide layer is connected to an indium tin oxide layer formed as the common electrode on the top plate through a dotting point formed between the top and bottom plates.

4. The thin film transistor-liquid crystal display according to claim 2, wherein the indium tin oxide layer is connected to an indium tin oxide layer formed as the common electrode on the top plate through a silver dotting point formed between the top and bottom plates.

5. A thin film transistor-liquid crystal display comprising:

a top plate;

a first transparent conductive layer formed on the top plate;

a bottom plate coupled to the top plate to face the first transparent conductive layer, the bottom plate having a non-overlapping region extending beyond the top plate and an overlapping region corresponding to the top plate;

a connection pad formed at the overlapping region of the bottom plate;

a first insulating layer formed on the bottom plate including the connection pad, the first insulating layer exposing a predetermined portion of the connection pad;

a second transparent conductive layer formed over the bottom plate, wherein the second transparent conductive layer extends over the non-overlapping region of the bottom plate to provide a testing pad for measuring a voltage applied thereto, and wherein the second transparent conductive layer is electrically connected with the exposed portion of the connection pad;

a dotting point over the connection pad for electrically connecting the first and second transparent conductive layers through the connection pad: and a pad terminal at the non-overlapping region of the bottom plate and electrically connected to the connection pad to provide a common voltage to the first transparent conductive layer.

6. The thin film transistor-liquid crystal display according to claim 5, further comprising a metal layer formed between the exposed portion of the connection pad and the second transparent conductive layer, the metal layer electrically connecting the second transparent conductive layer and the connection pad.

7. The thin film transistor-liquid crystal display according to claim 5, wherein the second transparent conductive layer directly contacts the exposed portion of the connection pad.

8. The thin film transistor-liquid crystal display according to claim 5, wherein the connection pad includes tapered sides.

9. The thin film transistor-liquid crystal display according to claim 5, wherein the dotting point is a silver dotting point.

10. The thin film transistor-liquid crystal display according to claim 5, wherein the first transparent conductive layer includes an indium tin oxide layer.

11. The thin film transistor-liquid crystal display according to claim 5, wherein the second transparent conductive layer includes an indium tin oxide layer.

12. A thin film transistor-liquid crystal display, comprising:

a first plate;

a common electrode formed on the first plate;

a second plate; and a common electrode formed on the second plate, wherein the first and second plates are bonded to each other with the common electrodes of the first and second plates electrically connected to each other, and wherein at least one of the common electrodes of the first and second plates extends beyond a scribe line to provide a testing pad for measuring a voltage applied thereto.

* * * * *